United States Patent [19]

Shirota

[11] 4,345,272

[45] Aug. 17, 1982

[54] VIDEO SIGNAL PROCESSING APPARATUS

[75] Inventor: Norihisa Shirota, Atsugi, Japan

[73] Assignee: Sony Corporation, Tokyo, Japan

[21] Appl. No.: 192,367

[22] Filed: Sep. 30, 1980

[30] Foreign Application Priority Data

Oct. 5, 1979 [JP] Japan .................................. 54-129254

[51] Int. Cl.$^3$ ............................................ H04N 9/535
[52] U.S. Cl. ..................................... 358/21 R; 358/4; 358/8; 360/38
[58] Field of Search ..................... 358/21 R, 4, 8, 163; 360/38

[56] References Cited

U.S. PATENT DOCUMENTS

| 4,122,489 | 10/1978 | Bolger et al. | ........................ | 358/21 |
| 4,250,521 | 2/1981 | Wright | ................................. | 358/21 |
| 4,272,785 | 6/1981 | Fuhrer | ................................. | 358/21 |

FOREIGN PATENT DOCUMENTS 2008888 6/1979 United Kingdom .

Primary Examiner—Richard Murray

Attorney, Agent, or Firm—Lewis H. Eslinger; Alvin Sinderbrand

[57] ABSTRACT

In an apparatus for processing a color video signal including luminance and chrominance components and composed of successive frames each having a plurality of fields constituted by successive lines which are interlaced in a pictorial representation of a complete frame, a memory is provided to have the received video signal written therein at an address at which there was earlier written the video signal of a line of the next previous field which, in the pictorial representation of the complete frame, is positioned immediately adjacent the line of the video signal being received. An error in the received video signal is detected and, in response thereto, the writing of the error-containing video signal in the memory is inhibited and the error-free video signal previously written at the corresponding address is read out, with the chrominance component of the readout signal being phase inverted and added to the luminance component of the read-out signal so as to provide a color video signal which can replace and conceal the error-containing signal.

11 Claims, 21 Drawing Figures

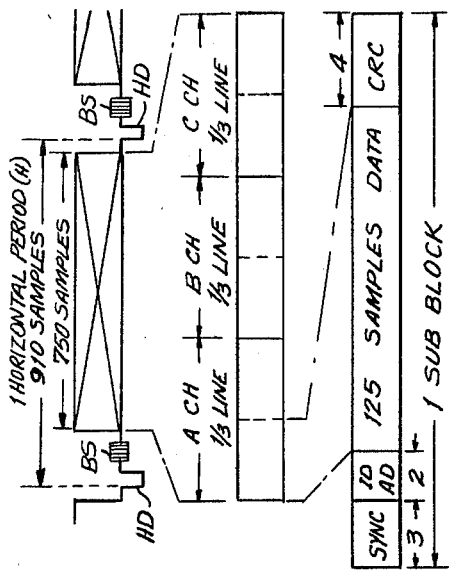
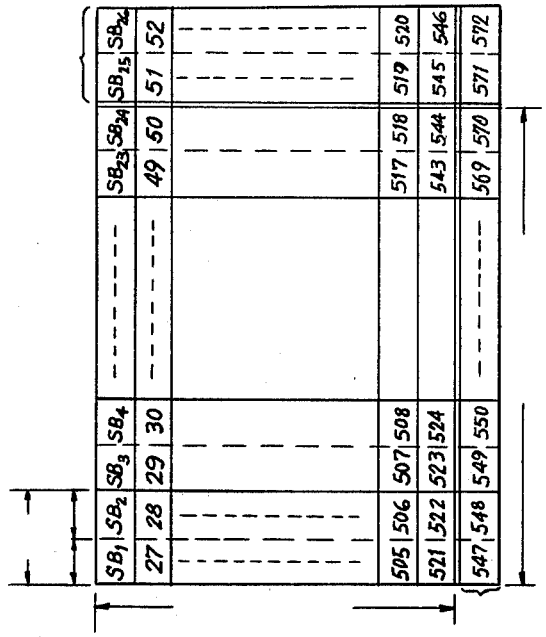
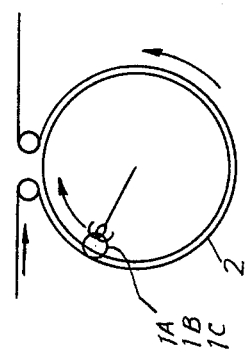
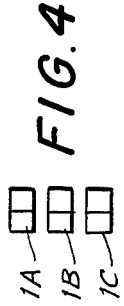
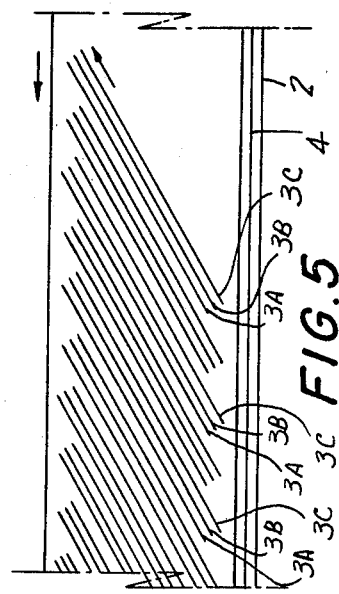

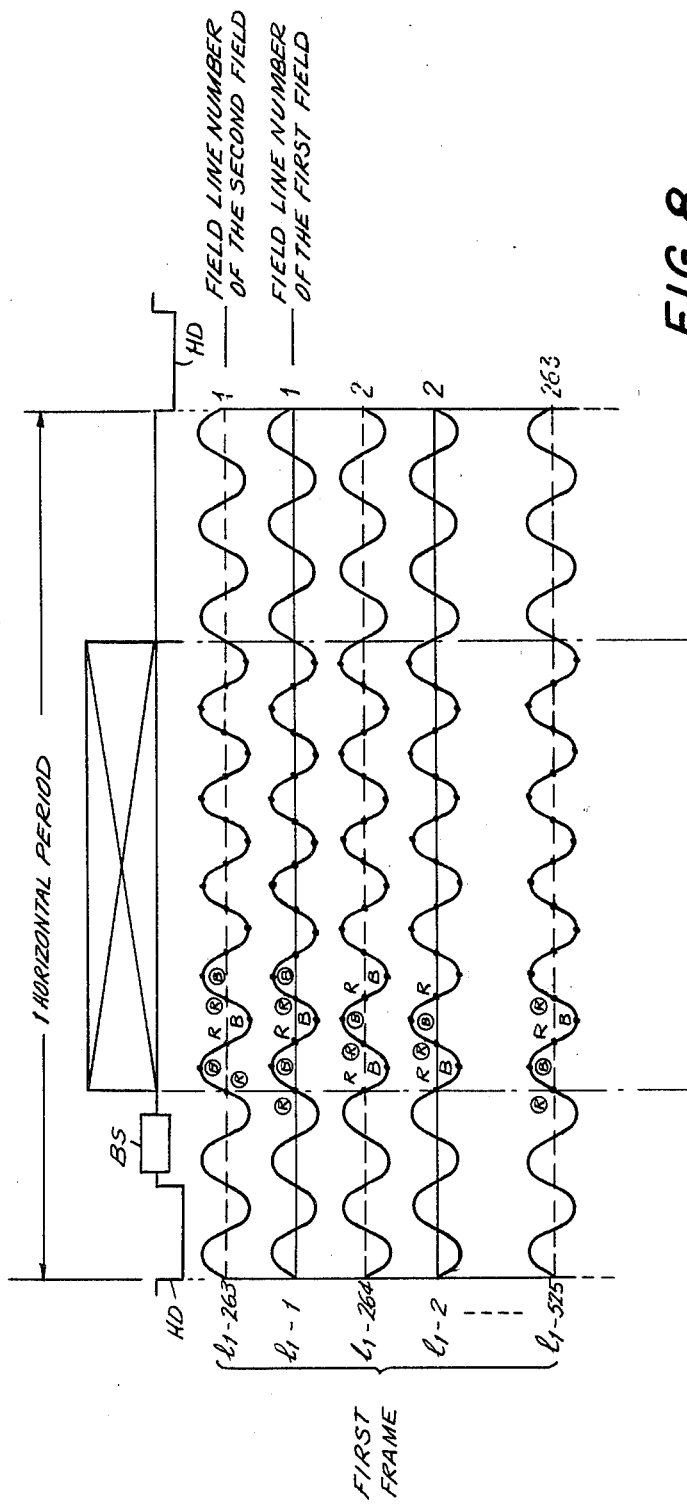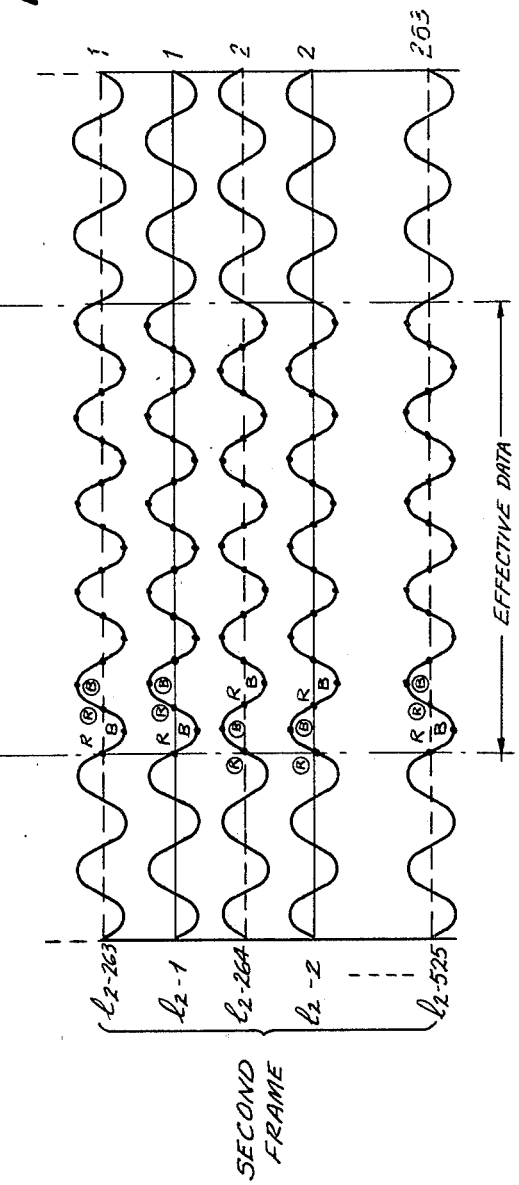
FIG.8

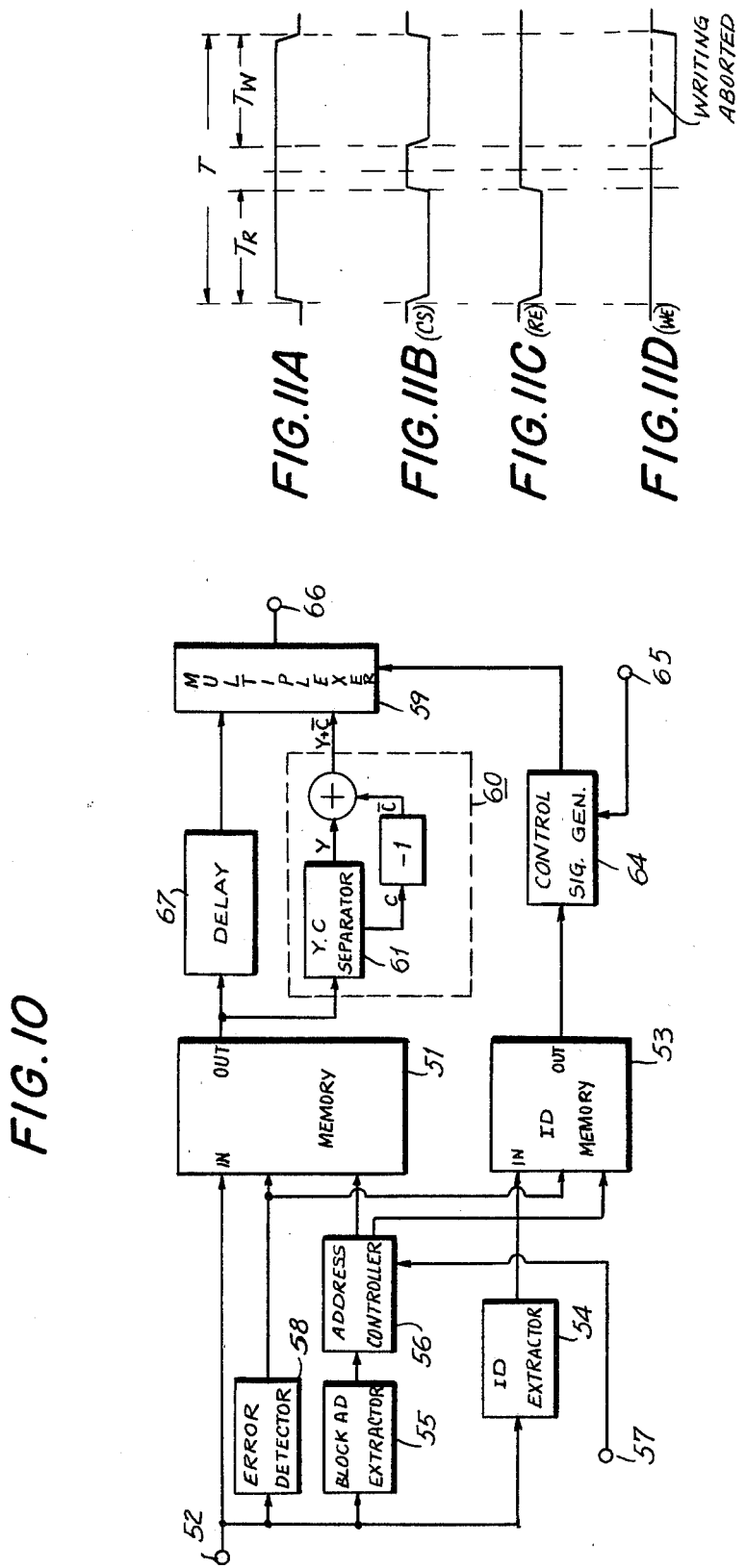

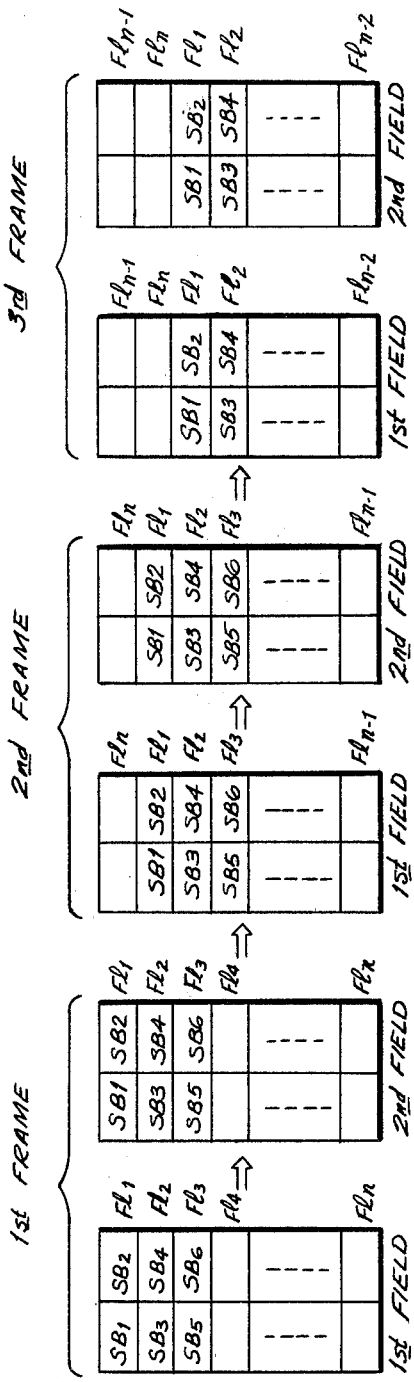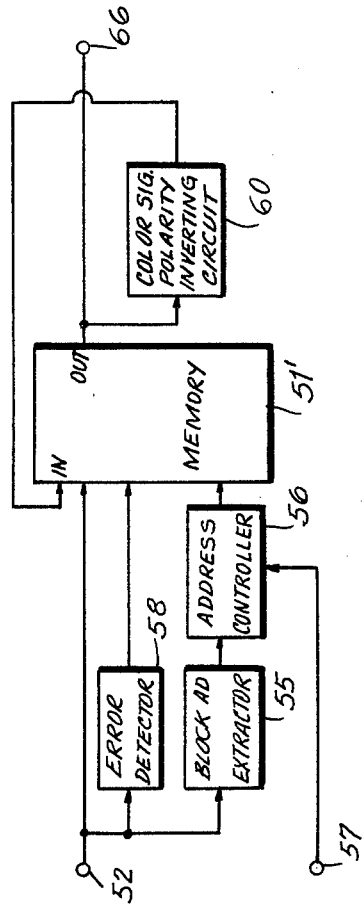

VIDEO SIGNAL PROCESSING APPARATUS

BACKGROUND OF THE INVENTION

1. Field of the Invention

This invention relates generally to an apparatus for concealing an error in a reproduced or received digital video signal.

2. Description of the Prior Art

In recording and reproducing a digital video signal by a rotary head type video tape recorder (VTR), random errors may result from head noise, tape noise or amplifier noise or a burst error may be caused by a signal dropout. It is a recognized advantage of digital signal processing that erroneous data can be mathematically corrected by the inclusion in the recorded or transmitted data of redundant bits. For example, a well known scheme for correcting digital data involves dividing the latter into blocks, each of which is recorded or transmitted along with a cyclic redundancy check (CRC) code and horizontal and vertical parity data so that, upon reproduction or reception, an error in any such block can be detected and then corrected on the basis of the respective parity data. However, the addition to the recorded information data of the redundant bits representing the CRC code and the parity data for the purpose of protecting the information data from error necessarily increases the recording bit rate which is limited by the necessity of minimizing the consumption of tape. Therefore, even if the code arrangement of the digital video signal is designed to be capable of error correction, the extent of the error may sometimes exceed the error correcting ability which is limited by the acceptable redundancy.

It has further been proposed to conceal an error in a transmitted or recorded video signal so that such error will not be noticed in the displayed picture. One error concealing method that has already been proposed involves interpolation of the erroneous data with data of the immediately preceding line of the same field, and such method relies on the strong correlation of a television picture in the vertical direction. Another conventional error concealing method involves replacement of the erroneous data with a mean value of data from the lines immediately preceding and following the line containing the error.

Each of the above error concealing methods obtains the signal which is to be interpolated or substituted for the erroneous data from the data of the same field. However, since the television picture is formed by interlaced scanning, it will be appreciated that adjacent lines in the same field are spaced apart by a distance that is twice the distance between adjacent lines in the pictorial representation of the complete frame made up of two interlaced fields. Therefore, the data in immediately adjacent lines of such pictorial representation of the complete frame and which occur in contiguous fields of the video signal have an even higher correlation therebetween.

In view of the foregoing, it has been proposed by the assignee of this application to effect error concealment by replacing error-containing data in a line of one field with corresponding data in a so-called interpolated line of the next previous field which, in the pictorial representation of the complete frame, is positioned immediately adjacent the error-containing line so that the data used for concealing an error will bear a closer resemblance to the original or correct data which it replaces.

However, in the case of color video signals, the phase of the chrominance component, that is, of the color subcarrier of the color information, may not be the same at corresponding locations in immediately adjacent lines of the pictorial representation of a complete frame. In other words, although the color information is the same at corresponding locations in such immediately adjacent lines, the polarities thereof may be relatively inverted. For example, in the case of an NTSC color video signal, if error-containing data in a line of one field is replaced with corresponding data in the line of the next previous field which, in the pictorial representation of a complete frame, is positioned immediately above the error-containing line, the color information in the interpolated line immediately above the error-containing line will be of inverted polarity in respect to the color information in the error-containing line and cannot be used for concealing the latter. Similarly, in the case of a PAL color video signal, if error-containing data in a line of one field is replaced with corresponding data in the line of the next previous field which, in the pictorial representation of the complete frame, is positioned immediately below the error containing line, the color information of the so-called interpolated line will be the same as, but of inverted polarity in respect to the corresponding color information in the error-containing line. On the other hand, if the interpolated line selected to replace an error-containing line of a PAL color video signal is the line which is immediately above the error-containing line in the pictorial representation of a complete frame, then the color information of each sampling point of the interpolated line will not even correspond to the color information at the corresponding point in the error-containing line.

OBJECTS AND SUMMARY OF THE INVENTION

Accordingly, it is an object of this invention to provide a video signal processing apparatus which is operative to effectively conceal an error in a color video signal.

More particularly, it is an object of this invention to conceal an error in a color video signal, even when the latter is a PAL signal.

Another object is to conceal an error in a digital color video signal by replacing the error-containing data with corresponding data in a line of the next previous field which, in a pictorial representation of a complete frame, is positioned immediately adjacent the error containing line so that the substituted or interpolated data will closely correspond to the correct version of the error-containing data even though the color information of the substituted data may have polarities that are inverted in respect to the polarities of the color information of the error-containing data.

Still another object is to conceal an error in a PAL color video signal by replacing the error-containing data with corresponding data in the line of the next previous field which, in the pictorial representation of the complete frame, is positioned immediately below the error-containing line, and to invert the polarities of the color information of the interpolated or substituted data prior to replacement of the error-containing data therewith.

In accordance with an aspect of this invention, an apparatus for processing a color video signal comprises memory means having an input for receiving the video signal, means for causing the writing of the video signal received by the memory means at an address in the latter at which there was earlier written the video signal for a line of the next previous field which, in a pictorial representation of a complete frame, is positioned immediately adjacent the line of the video signal being received, means for detecting an error in the video signal being received and for inhibiting the writing in the memory means of the error-containing video signal, means for reading out the video signal stored in the memory means, means for inverting the phase of the chrominance component of the read out video signal, and means for adding the phase-inverted chrominance component to the luminance component of the video signal read out of the memory means upon the detection of an error.

In the case of a PAL color video signal, the received video signal is written in the memory means at an address at which there was earlier written the video signal for the line of the next previous field which, in the pictorial representation of a complete frame, is immediately below the error containing line. On the other hand, in the case of an NTSC color video signal, the address at which the received video signal is written in the memory means is that at which there was earlier written the video signal for the line positioned immediately above the error-containing line in the pictorial representation of a complete frame.

In an embodiment of the invention, the color video signal is a digital signal converted from an analog video signal and forming a data block for each predetermined number of bits with an address signal and an identifying signal for each block, and the apparatus further comprises an identifying signal extracting circuit for extracting the identifying signal from each block of the video signal, an identifying signal memory device, and a control signal generator in which the identifying signal read out from the identifying signal memory device is compared with an external reference signal to generate a control signal to select the added signal from the means for adding as an output of the apparatus upon the detection of an error.

In another embodiment of the invention, the added signal, that is, the result of the adding of the phase-inverted chrominance component to the luminance component of the video signal read out of the memory means, is re-written in the memory means at the same address from which the video signal was initially read immediately following such initial reading.

The above, and other objects, features and advantages of this invention, will be apparent from the following detailed description which is to be read in conjunction with the accompanying drawings.

BRIEF DESCRIPTION OF THE DRAWINGS

FIG. 3 is a schematic illustration of a rotary head assembly included in the digital VTR of FIGS. 1 and 2;

FIG. 4 is a schematic view of rotary heads included in the assembly of FIG. 3;

FIG. 5 is a schematic plan view of a section of magnetic tape showing tracks in which signals are recorded;

FIGS. 6A, 6B, 6C and 7 are schematic diagrams to which reference will be made in explaining the digitization and code arrangement of a video signal for use in the digital VTR embodying this invention;

FIG. 8 is a graph to which reference will be made in explaining the phase relation of color subcarriers of an NTSC color video signal;

FIG. 10 is a block diagram showing a video signal processing apparatus according to an embodiment of this invention;

FIGS. 11A to 11D are timing charts to which reference will be made in explaining the operation of the apparatus of FIG. 10;

FIGS. 12A to 12C are schematic diagrams to which reference will be made in explaining address control for a memory included in the apparatus of FIG. 10;

FIG. 13 is a block diagram showing a video signal processing apparatus according to another embodiment of this invention.

DESCRIPTION OF THE PREFERRED EMBODIMENTS

Figure 1:
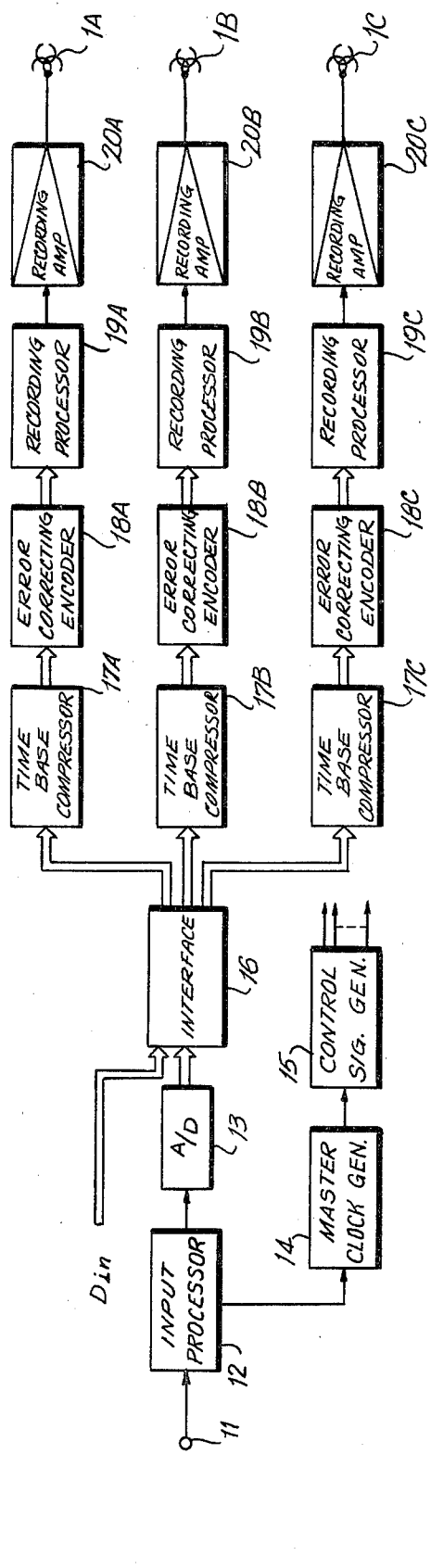
FIGS. 1 and 2 are block diagrams illustrating recording and reproducing sections, respectively, of a digital video tape recorder (VTR) in which a video signal processing apparatus embodying this invention may be advantageously employed.
Figure 2:
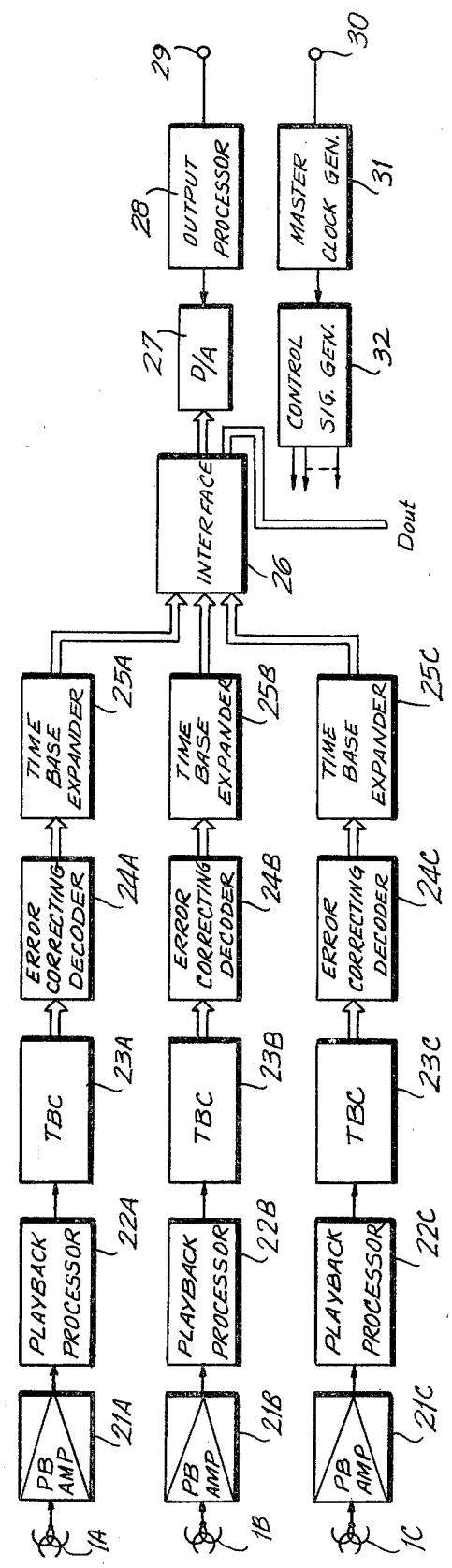

The present invention will hereinafter be described as being applied to a digital VTR made up of a recording section (FIG. 1) and a playback or reproducing section (FIG. 2). In the digital VTR, a digital video signal is recorded by a rotary head assembly (FIG. 3) in parallel tracks extending obliquely on a magnetic tape 2 (FIG. 5). Since the transmitting bit rate of the digital video signal is high, three rotary heads 1A, 1B and 1C (FIG. 4) are disposed in close proximity to each other, and the digital video signals of one field are distributed through three channels to such heads and recorded on the magnetic tape in three parallel tracks 3A, 3B and 3C (FIG. 5). An audio signal may also be converted to a PCM (pulse code modulated) signal and recorded by a rotary head (not shown) in another track (not shown) extending parallel to the video tracks 3A, 3B and 3C. Alternatively, the audio signal may be recorded in a track 4 (FIG. 5) extending along a longitudinal edge of the tape.

Referring in detail to FIG. 1 it will be seen that a color video signal to be recorded is applied through an input terminal 11 to an input processor 12. The input processor 12 may comprise a clamp circuit and a synchronizing and burst signal separator and supplies the effective or video information portion of the color video signal to an A/D converter circuit 13. A synchronizing signal and a burst signal separated from the color video signal by processor 12 are applied to a master clock generator 14 which is desirably of PLL (phase locked loop) construction. The master clock generator 14 generates clock pulses of a suitable sampling frequency fs. The clock pulses from generator 14 and the synchronizing signal are applied to a control signal generator 15 which produces various kinds of timing pulses, identification signals (ID) for identifying lines, fields, frames and tracks, and a control signal, such as, a train of sampling pulses.

The A/D converter circuit 13 generally comprises a sample hold circuit and an A/D converter for converting each sampled output to an 8-bit code which is supplied, in parallel form, to an interface 16. The digitized effective video region of the color video signal is divided by the interface 16 into three channels. The data corresponding to the successive samples of each line are assigned cyclically to the three channels in a repeating order, and the data of the three channels are processed in the same manner. An external digital video signal Din, for example, from an editing apparatus, may also be supplied to interface 16 to be suitably divided into the three channels. The data in one of the channels is derived as a record signal for head 1A after being applied, in sequence, to a time base compression circuit 17A, an error correcting encoder 18A, a recording processor 19A and a recording amplifier 20A. The data in each of the other channels is also processed by the same arrangement, that is, by a time base compression circuit 17B, 17C, an error control encoder 18B, 18C, a recording processor 19B, 19C, and a recording amplifier 20B, 20C, to provide record signals for heads 1B and 1C.

In the case of the NTSC color video signal, the duration or period of one line (1H) is 63.5 μs and a blanking period therein is 11.1 μs. Accordingly, the effective video region or portion is 52.4 μs. If the sampling frequency employed in A/D converter circuit 13 is 4 $f_{SCN}$, in which $f_{SCN}$ is the color subcarrier frequency = 455/2 $f_{HN}$ ($f_{HN}$ being the horizontal or line frequency), then the number of samples in each horizontal period H is 910, as indicated on FIG. 6A. Further, the number of samples in the effective video region of each line is 750, that is, 52.4/63.5 × 910 = 750, so that 250 samples can be conveniently assigned to each of the channels for each line.

The number of lines forming one field is 262.5, with a vertical synchronizing period and an equalizing pulse period accounting for 10.5H. Since test signals VIT and VIR are inserted in the vertical blanking period, they are also regarded as effective video signals, the number of effective video lines in one field period is selected to be 252.

The code arrangement of each of the record signals respectively provided to the heads 1A, 1B and 1C will now be described with reference to FIGS. 6B and 6C. As there shown, the data of one line or horizontal period of the color video signal which comprises 250 samples per channel, as previously mentioned, are divided into two, that is, there are two sub-blocks for each line with 125 samples of data for each sub-block. Each sub-block of the coded digital signal may be composed of 134 samples (1072 bits) in which a block synchronizing signal (SYNC) of three samples (24 bits), an identifying (ID) and address (AD) signal of two samples (16 bits), the information data of 125 samples (1000 bits) and CRC (Cyclic Redundancy Check) code of four samples (32 bits) are arranged one after another. The block synchronizing signal is used for identifying the beginning of a sub-block, whereupon the identifying and address signals, the information data and/or CRC code can be extracted. The identifying signals ID indicate the channel (track), the frame, the field and the line to which the information data of the sub-block belongs, and the address signal AD represents the address of the respective sub-block. The CRC code is used for the detection of an error in the information data of the respective sub-block.

FIG. 7 shows the code arrangement for one field in one channel. In FIG. 7, each reference character $SB_i$ (i = 1 ~ 572) indicates one sub-block, with two sub-blocks making up one block or line. Since the effective video region of one field is comprised of 252 lines, as mentioned previously, the data of 252 blocks (504 sub-blocks), exist in one field. The video information data of a particular field are sequentially arranged in a 21 × 12 matrix form. Parity data are also provided in connection with the horizontal and vertical directions, respectively, of the video information data in the matrix. More particularly, on FIG. 7, the parity data for the horizontal direction is shown positioned in the thirteenth column of blocks, and the parity data for the vertical direction is positioned in the twenty-second row at the bottom. In the thirteenth column of blocks at the twenty-second row is disposed the horizontal parity data for the vertical parity data. The parity data for the horizontal direction is formed in two ways by 12 sub-blocks respectively taken out of the 12 blocks forming one row of the matrix. In the first row, for example, parity data $SB_{25}$ is formed by the modulo 2 addition:

$$[SB_1] \oplus [SB_3] \oplus [SB_5] \oplus \ldots \oplus [SB_{23}] = [SB_{25}]$$

In the above, [SBi] means only the data in the respective sub-block SBi. In this case, samples belonging to respective ones of the 12 sub-blocks are each calculated in a parallel, 8-bit form. Similarly, by the modulo 2 addition:

$$[SB_2] \oplus [SB_4] \oplus [SB_6] \oplus \ldots \oplus [SB_{24}] = [SB_{26}]$$

parity data $[SB_{26}]$ is formed. The parity data is similarly formed for each of the second to twenty-second rows in the horizontal direction. Enhancement of the error correcting ability results from the fact that parity data is not formed merely by the data of the 24 sub-blocks included in a row, but is formed by the data of 12 sub-blocks positioned at intervals in the row.

The parity data for the vertical direction is formed by the data of 21 sub-blocks in each of the first to twelve columns of blocks. In the first column, parity data $[SB_{547}]$ is formed by the modulo 2 addition:

$$[SB_1] \oplus [SB_{27}] \oplus [SB_{53}] \oplus \ldots [SB_{521}] = [SB_{547}]$$

In this case, samples belonging to each one of the 21 sub-blocks are each calculated in a parallel 8-bit form.

Accordingly, these parity data comprise 125 samples as is also the case with the video data of each sub-block. In the case of transmitting the digital signal of one field of the above matrix arrangement (22 × 13) as a series of first, second, third, ... twenty-second rows in sequence, since 13 blocks correspond to the length of 12H, a period of 12 × 22 = 264H is needed for transmitting the digital signal of one field.

Incidentally, if the VTR is of the C-format type, and thus employs an auxiliary head for recording and reproducing one part of the vertical blanking period in one field, then a duration of only about 250H can be recorded with a video head. Therefore, the period of 264H of data to be transmitted is time-base-compressed (with a compression ratio of Rt of 41/44) to a period or duration of 246H by means of the time base compressor 17A, 17B or 17C so as to leave a margin of several Hs to be recorded in each track. In addition to compressing the video data with the above-noted compression ratio 41/44, each of the time base compressors 17A, 17B and 17C provides a data blanking period in which the block synchronizing signal, the identifying and address signals and the CRC code are inserted for each sub-block of video data of 125 samples, and at the same time, sets up data blanking periods in which the blocks of the parity data are inserted. The parity data for the horizontal and vertical directions and the CRC code of each sub-block are generated by the respective error correcting encoder 18A, 18B or 18C. The block synchronizing signal and the identifying and address signals are added to the video data in the respective recording processor 19A, 19B or 19C. The address signal AD represents the previously noted number (i) of the sub-block. Further, in the recording processor 19A, 19B or 19C there may be provided an encoder of the block coding type which converts the number of bits of one sample from 8 to 10, and a parallel-to-serial converter for serializing the parallel 10-bit code. As disclosed in detail in U.S. Patent Application Ser. No. 171,481 dated July 23, 1980 and having a common assignee herewith, the block coding is preferably such that $2^8$ codes whose DC levels are close to zero are selected from $2^{10}$ codes of 10-bit and arranged to have one-to-one correspondence to the original 8-bit codes. By means of the foregoing, the DC level of the record signal is made as close to zero as possible, that is, "0" and "1" alternate with each other as much as possible. Such block coding is employed for preventing degradation of the transmitting waveform on the playback side by substantial DC free transmission. It is also possible to achieve the same results by employing a scramble system utilizing the so-called M-sequence which is substantially random in place of the block coding.

In the reproducing or play-back section of the digital VTR to which this invention is advantageously applied, three channels of reproduced signals are derived from the heads 1A, 1B and 1C which scan tracks 3A, 3B and 3C, respectively, corresponding thereto. As shown on FIG. 2, the reproduced signals are applied from heads 1A, 1B and 1C through play-back amplifiers 21A, 21B and 21C to respective play-back processors 22A, 22B and 22C. In each of the playback processors 22A, 22B and 22C, the serial data is converted to parallel form, the block synchronizing signal is extracted, the data is separated from the block synchronizing signal and from the ID, AD and CRC codes or signals, and further, block decoding or 10-bit to 8-bit conversion is performed. The resulting data is applied to a respective time base corrector 23A, 23B or 23C in which any time base error is removed from the data. Each of the time base correctors is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

The data of each channel is provided from the respective time base corrector 23A, 23B or 23C to an error correcting decoder 24A, 24B or 24C in which, as hereinafter described in detail, an error occurring in the information data, and particularly one that cannot be corrected by means of the horizontal and vertical parities, is concealed. The data from each error correcting decoder 24A, 24B or 24C is applied to a respective time base expander circuit 25A, 25B or 25C, respectively, which returns the data to the original transmitting rate and then applies the data to a common interface 26. The interface 26 serves to return the reproduced data of the three channels into a single channel which includes a D/A converter circuit 27 for conversion of the data into analog form. From the interface 26 there may also be provided a digital video output Dout. Since a digital video input Din and a digital video output Dout are provided in the recording and reproducing sections of FIGS. 1 and 2, editing and dubbing can be carried out with digital signals, that is, without conversion from and/or to analog form.

The output from the D/A converter circuit 27 is applied to an output processor 28, from which a reproduced color video signal is provided at an output terminal 29. An external reference signal is supplied from a terminal 30 to a master clock generator 31, from which clock pulses and a reference synchronizing signal are provided to a control signal generator 32. The control signal generator 32 provides control signals synchronized with the external reference signal, such as, various timing pulses, identifying signals for the line, field and frame, and sample clock pulses. In the reproducing section, the processing of the signals from heads 1A, 1B and 1C to the input sides of time base correctors 23A, 23B and 23C is timed by a clock pulse extracted from the reproduced data, whereas the processing of the signals from the output sides of the time base correctors 23A, 23B and 23C to the output terminal 29 is timed by the clock pulse from the master clock generator 31.

Before providing a more detailed description of the error correcting decoders 24A, 24B and 24C embodying the present invention, the understanding of the invention will be facilitated by the following description of the relationship between the color information in immediately adjacent line of a pictorial representation of a complete frame of an NTSC color video signal, as shown on FIG. 8. As earlier noted, in the NTSC system, the color subcarrier frequency $f = 455/2\, f_{HN} = (227 + \frac{1}{2})\, f_{HN}$. Therefore, the phase of the color subcarrier is inverted between one line in one field and the next line in the same field, and also between one line in one frame and the same line in the next frame.

If sampling of the color video signal is effected with a sampling frequency of $4f_{SCN}$, as earlier assumed, and if the sampling is effected at 0°, 90°, 180° and 270° in respect to the $(E_B - E_Y)$ or blue color difference signal axis starting from 0° relative to such axis for the first line in the first field of the first frame, then, the color information for two frames will be as shown in FIG. 8.

In the case of the designation of the lines at the left-hand side of FIG. 8, the numbers given to the lines in the first and second fields of each frame are such that the first or odd-numbered field is constituted by the 1st to the 262nd lines, for example, as at $l_{1-1}$ to $l_{1-262}$ in the first field of the first frame, and the second or even-numbered field is constituted by the 263rd to 525th lines, for example, as at $l_{1-263}$ to $l_{1-525}$ in the second field of the first frame. However, if the lines are numbered in order for each field, as at the right-hand side of FIG. 8, then each first or odd-numbered field will contain field line numbers 1 to 262, as shown in field lines on FIG. 8, and each second or even-numbered field will contain field line numbers 1 to 263, as enumerated in dotted lines at the right-hand side of FIG. 8. Considering such field line numbers, it will be seen that a line in the second or even-numbered field will be disposed immediately above the line of the first or odd-numbered field identified by the same field line number in the pictorial representation of the complete frame.

However, as earlier noted, in a digital VTR only effective video lines are selected for recording so that, for example, the first and second fields of each frame may each be constituted by 1st to 252nd field lines. In such case also, it will be apparent that a line in the second or even-numbered field, when viewed in the pictorial representation of a complete frame, appears immediately above the line in the first or odd-numbered field which is identified by the same field line number.

In FIG. 8, lines in the first field of each frame are indicated by solid lines, and lines in the second field of each frame are indicated by broken lines, with the phase of the subcarrier being shown superimposed thereon. Merely for the sake of clarity and ease of illustration, the subcarrier has been shown on FIG. 8 with a very substantially reduced frequency, and more particularly, as if $f_{SCN}=(9+\frac{1}{2})f_{HN}$ rather than $(227+\frac{1}{2})$ as is actually the case for the NTSC system. For the same reason, FIG. 8 shows the effective data of each line extending over only five cycles of the color subcarrier, with the sampling being effected only within that region, as represented by the black dots, and it will be understood that, in actual practice, the number of samples in the effective video region of each line is 750 for a sampling frequency of $4 \times f_{SCN}$ in the case of an NTSC signal, as previously noted.

The level of an NTSC color video signal $S_k$ is determined by the below equation:

$$S_k = E_Y + \frac{1}{1.14}(E_R - E_Y)\cos \omega_c t + \frac{1}{2.03}(E_B - E_Y)\sin \omega_c t \quad (1)$$

OR $$S_k = E_Y + DR_N \cos \omega_c t + DB_N \sin \omega_c t \quad (2)$$

$$\omega_c = 2\pi f_c$$

$$DR_N \text{ is } \frac{1}{1.14}(E_R - E_Y)$$

$$DB_N \text{ is } \frac{1}{2.03}(E_B - E_Y)$$

If the signal levels at the sampling points which are at 0°, 90°, 180° and 270° in respect to the $(E_B-E_Y)$ axis are respectively represented by $S_1$, $S_2$, $S_3$ and $S_4$, the following are obtained from equation (2):

$S_1 = Y_1 + DR_{N1}$ ($\omega ct = 0°$)

$S_2 = Y_2 + DR_{N2}$ ($\omega ct = 90°$)

$S_3 = Y_3 - DR_{N3}$ ($\omega ct = 180°$)

$S_4 = Y_4 - DB_{N4}$ ($\omega ct = 270°$)

Since the first line in the first field of the first frame starts at 0° with respect to the $(E_B-E_Y)$ axis as described previously, the color signals at the sampling points become a positive polarity red color difference signal $+(E_R-E_Y)=DR_N$ at 0°, a positive polarity blue color difference signal $+(E_B-E_Y)=+DB_N$ at 90°, a negative polarity red color difference signal $-(E_R-E_Y)=-DR_N$ at 180°, and a negative polarity blue color difference signal $-(E_B-E_Y)=-DB_N$ at 270°. On FIG. 8, the symbols ⓡ, R, ⓑ and B are used to indicate the signals $+DR_N$, $-DR_N$, $+DB_N$ and $-DB_N$, respectively.

As will be noticed from FIG. 8, since the sampling frequency $f_s$ is $4f_{SCN}$ and exactly an integral multiple of the horizontal frequency $f_{HN}$, the sampling phases or positions of the sampling points coincide with each other on all of the lines and the numbers of sampling points are the same on all of the lines.

Further, the color information at a sampling point of a particular line and the color information at the corresponding sampling point of a line in the next previous field, which is positioned immediately below the first mentioned line in the pictorial representation of the complete frame, are the same as each other and have the same phases or polarities. Thus, for example, the color information at any sampling point in the first line $l_{1-263}$ in the second field of the first frame is shown on FIG. 8 to be the same and of the same phase or polarity as the color information at the corresponding sampling point in the first line $l_{1-1}$ in the first field of the first frame as the line $l_{1-1}$ appears immediately below the line $l_{1-263}$ in the pictorial representation of the complete frame composed of first and second interlaced fields. Similarly, with respect to the first line $l_{2-1}$ in the first field of the second frame, it will be understood that the second line $l_{1-264}$ in the second field of the first frame would be positioned immediately below the line $l_{2-1}$ in the pictorial representation of the complete frame composed of the second field of the first frame and the first field of the second frame. Thus, at corresponding sampling points in the lines $l_{2-1}$ and $l_{1-264}$, the color information will be the same and of the same phase or polarity.

Therefore, if an uncorrectable error or dropout occurs in an NTSC color video signal, such error can be conveniently concealed by replacing error-containing data in a line of one field with corresponding data in the line of the next previous field which, in the pictorial representation of a complete frame, is positioned immediately below the error-containing line so that the data used for concealing an error will contain color information which is the same, and of the same polarity as the color information in the original or correct data which it replaces.

However, it will be seen from FIG. 8 that, although the color information at a sampling point on a particular line is the same as that at the corresponding sampling point on a line in the next previous field which is positioned immediately above the first mentioned line in the pictorial representation of a complete frame, the color information at the two sampling points will be of different polarities. For example, at each sampling point on line $l_{1-1}$ of the first field in the first frame, the color information is the same as that at the corresponding sampling point on line $l_{1-264}$ of the second field of the first frame, but of the opposite polarity. Thus, error-containing data in the line $l_{1-264}$ cannot be concealed merely by replacing the same with corresponding data from the line $l_{1-1}$ of the next previous field which appears immediately above the line $l_{1-264}$ in the pictorial representation of a complete frame.

An even more acute problem exists in respect to the concealing of uncorrected errors in a PAL color video signal. The level of a PAL color video signal $E_M$ is determined by the below equation:

$$E_M = E_Y + E_u \sin 2\pi f_{SCP} t \pm E_V \cos 2\pi f_{SCP} t \quad (3)$$

in which
$E_U = 0.493(E_B - E_Y) \cong DB_P$
$E_V = 0.877(E_R - E_Y) \cong DR_P$
$(E_B - E_Y)$: blue color difference signal
$(E_R - E_Y)$: red color difference signal The (±) sign before the third term at the righ-hand side of equation (3) implies that the phase of $E_V$ or the ($E_R-E_Y$) axis alternates at every line in accordance with the polarity of the burst signal.

In the case of the PAL color video signal, the color subcarrier frequency $f_{SCP}=(1135/4+1/625)f_{HP}=(283+\frac{3}{4}+1/625)f_{HP}$, with $f_{HP}$ being the horizontal frequency. Therefore, it will be apparent that the phase of the color subcarrier repeats every four frames.

As will be obvious from equation (3), the $E_V$ or ($E_R-E_Y$) axis is inverted in phase at every line, while the $E_U$ or ($E_B-E_Y$) axis is not inverted in phase at every line. Therefore, if data is sampled with respect to the $E_U$ axis by using a sampling frequency of $4f_{SCP}$ as in the previously described case using the NTSC system, it is equivalent to effecting samplings at 0°, 90°, 180° and 270° with respect to the $E_U$ axis. If it is assumed that the phase of the first line in the first field of the first frame $F_1$ starts at 0° in respect to the $E_U$ axis, then the color information and the phases thereof at the sampling points in the first frame $F_1$ through the fourth frame $F_4$ are as shown on FIG. 9.

Figure 9:
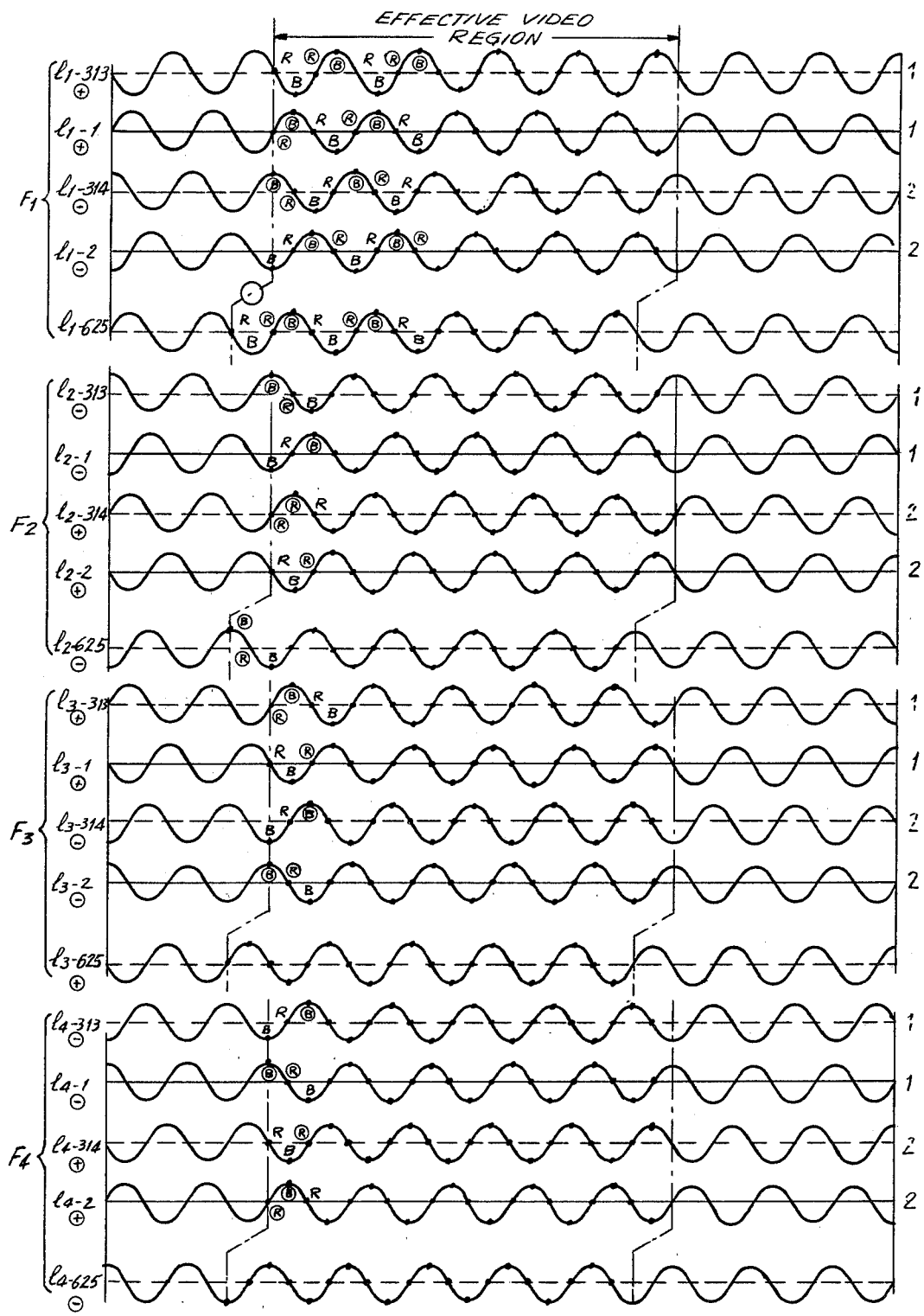
FIG. 9 is a similar graph to which reference will be made in explaining the phase relation of color subcarriers of a PAL color video signal.

Although the color subcarrier frequency $f_{SCP}$ for the PAL system is $(283+\frac{3}{4}+1/625)f_{HP}$, as noted above, for the sake of simplicity and clarity of illustration, the curves representing the color subcarrier have been drawn on FIG. 9 as though the color subcarrier frequency is only $(9+\frac{3}{4}+1/625)f_{HP}$, and also as though the effective region of each line is only composed of five cycles of the subcarrier.

In FIG. 9, lines in the first field of each frame are again indicated by solid lines, and lines in the second field of each frame are indicated by broken lines, with the phase of the subcarrier being shown superimposed thereon. In the case of the designation of the lines at the left-hand side of FIG. 9, the numbers given to the lines in the first and second fields of each frame are such that the first or odd-numbered field is constituted by the 1st to the 312th lines, for example, as at $l_{1-1}$ to $l_{1-312}$ in the first field of each frame, and the second or even-numbered field is constituted by the 313th to 625th lines, for example, as at $l_{1-313}$ to $l_{1-625}$ in the second field of each frame. However, if the lines are numbered in order for each field, then each first or odd-numbered field will contain field line numbers 1 to 312, as shown in full lines at the right-hand side of FIG. 9, and each second or even-numbered field will contain field line numbers 1 to 313, as enumerated in dotted lines at the right-hand side of FIG. 9. Considering such field line numbers, it will be seen that, in the pictorial representation of a complete frame, a line in the second or even-numbered field will be disposed immediately above the line of the first or odd-numbered field identified by the same field line number.

In order to indicate that the phase of the red color difference signal $DR_P$ is inverted at every line of the pictorial representation of each complete frame on FIG. 9 in which the polarity of $DR_P$ in the first line of the first field in the first frame is assumed to be positive, a positive polarity of the red color difference signal $DR_P$ in a line is indicated by the symbol $\oplus$ under the respective line number at the right-hand side of FIG. 9 and a negative polarity of the signal $DR_P$ in a line is indicated by a similarly situated symbol $\ominus$. With such an arrangement, the color signal at the sampling points along each line can be obtained by substituting the values of 0°, 90°, 180° and 270° for $2\pi f_{SCP}t$ in equation (3) in the same manner as indicated above for obtaining the values of $S_1$, $S_2$, $S_3$ and $S_4$ in the case of the NTSC system. Thus, at the lines of positive polarity, the color signal becomes $+DR_P$ at 0°, $+DB_P$ at 90°, $-DR_P$ at 180° and $-DB_P$ at 270°, and, at the lines of negative polarity, the color signal becomes $-DR_P$ at 0°, $+DB_P$ at 90°, $+DR_P$ at 180° and $-DB_P$ at 270°. On FIG. 9, the symbols Ⓡ, R, Ⓑ and B are used to indicate the signals $+DR_P$, $-DR_P$, $+DB_P$ and $-DB_P$, respectively.

As is apparent from FIG. 9, the color information at a sampling point of a particular line and the color information at the corresponding sampling point of a line in the next previous field, which is positioned immediately below the first mentioned line in the pictorial representation of the complete frame, are the same as each other but have relatively inverted phases or polarities. On the other hand, the color information as a sampling point on a particular line is different from the color information at the corresponding sampling point on a line in the next previous field which is positioned immediately above the first mentioned line in the pictorial representation of a complete frame.

Therefore, if an uncorrectable error or dropout occurs in a PAL color video signal, such error cannot be concealed merely by replacing error-containing data in a line of one field with corresponding data in the line of the next previous field which, in the pictorial representation of a complete frame, is positioned immediately adjacent the error-containing line. If the interpolated line selected to replace an error-containing line of a PAL color video signal is the line which is immediately above the error-containing line in the pictorial representation of a complete frame, then the color information of each sampling point of the interpolated line will not even correspond to the color information at the corresponding point in the error-containing line. On the other hand, if error-containing data in a line of one field of a PAL color video signal is replaced with corresponding data in the line of the next previous field which, in the pictorial representation of the complete frame, is positioned immediately below the error containing line, the color information of the so-called interpolated line will be the same as, but of inverted polarity in respect to the corresponding color information in the error-containing line. Similarly, to the latter, if it is attempted, in the case of an NTSC color video signal, to replace error-containing data in a line of one field with corresponding data in the line of the next previous field which, in the pictorial representation of a complete frame, is positioned immediately above the error-containing line, the color information in the interpolated line immediately above the error-containing line will be of inverted polarity in respect to the color information in the error-containing line and cannot be used for concealing the error.

Generally, in accordance with this invention, the foregoing problems in concealing an uncorrected error in the reproduced color video signal received by each of the error-correcting decoders 24A, 24B and 24C are overcome by providing each of the latter with an apparatus for writing the received video signal in a memory at an address thereof where there was earlier written the video signal for a line of the next previous field which, in a pictorial representation of a complete frame, is positioned immediately below the line of the received video signal, when the latter is of the PAL system, or is positioned immediately above the line of the received video signal, when such signal is an NTSC color video signal, detecting an uncorrected error in the video signal being received and inhibiting the writing in the memory of the error-containing video signal, reading out the video signal stored in the memory, and inverting the phase of the chrominance component of the read out video signal and adding the phase-inverted chrominance component to the luminance component of the video signal read out of the memory upon the detection of an uncorrected error in the received video signal.

The invention will now be more specifically described in its application to the recording and reproducing or playback of a PAL color video signal by means of a digital VTR of the type previously described with reference to FIGS. 1 and 2.

As earlier described with reference to the recording of an NTSC color video signal, only effective lines of the PAL color video signal need to be selected for recording and reproducing. Thus, for example, the number of effective video lines may be 300 in each of the first and second fields of each frame. Accordingly, in each field, the same field line numbers, such as, $Fl_1$, $Fl_2$, $Fl_3$, - - - $Fl_{300}$, can be used to designate the first, second, third, - - - three hundredth lines of the respective field. In that case, a line of the second field of a frame is positioned immediately above, in the pictorial representation of the frame, the line of the first field which is identified by the same field line number. Further, as previously described for an NTSC color video signal with reference to FIGS. 6A-6C, the data for each line of the PAL color video signal is divided into three channels, that is, each channel receives $\frac{1}{3}$ of the samples representing the data for a line. Moreover, a sub-block SB is formed of $\frac{1}{2}$ of the samples provided to a channel for each line, that is, each sub-block includes 1/6 of the data for a line. Similarly to FIG. 6C, each sub-block includes, in addition to the respective data representing 1/6 of a line of the PAL color video signal, a block synchronizing signal, an identifying signal (ID) which identifies the line, field and frame to which the respective data belong, an address signal (AD) which identifies the respective sub-block (such as, $SB_1$, $SB_2$, $SB_3$ - - - etc.) and a CRC (Cyclic Redundancy Check) code for use in determining whether an error exists in the respective data. Therefore, the recording and reproducing of the PAL color video signal can be carried out substantially in the same manner as has been described above for the NTSC color video signal.

Referring now to FIG. 10, it will be seen that a video signal processing apparatus according to an embodiment of this invention that may be employed in each of the error correcting decoders 24A, 24B and 24C comprises a memory device 51 having a capacity suitable for memorizing the data for one channel of a field of the video signal. The memory device 51 may be formed of a random access memory (RAM) and its surrounding control circuit, and is supplied, at an input 52, with the reproduced digital color video signal from the time base corrector 23A, 23B or 23C, respectively, of FIG. 2, or with a reproduced digital color video signal which has been error-corrected to the extent possible by the horizontal parity and vertical parity in an error correcting circuit (not shown) which forms no part of the present invention.

Another memory device 53 is provided for memorizing the identifying signal ID contained in each sub-block of the digital video signal applied to terminal 52, and which is separated from such digital video signal by an identifying signal extracting circuit 54. The memory device 53 is also formed of a random access memory (RAM) and its surrounding control circuit. The digital video signal from input terminal 52 is further supplied to an address signal extracting circuit 55 to obtain the address signal AD from each sub-block, and each extracted address signal is supplied to a writing address control circuit 56.

The control circuit 56 may include, for example, a read-only memory (ROM) which provides an address map by which an actual absolute address is derived in response to the address signal AD extracted from a sub-block by circuit 55. In other words, the address signal AD extracted from a sub-block causes the ROM of control circuit 56 to provide an address code identifying actual addresses in memory devices 51 and 53 at which the data and the ID signal of such sub-block are to be written, and further to determine the addresses in memory devices 51 and 53 from which information data and an ID signal are thereafter read. Further, a frame pulse in synchronism with an external reference signal is applied to address control circuit 56 through an input terminal 57, and such frame pulse is effective, at each change of the frame, to shift the absolute addresses provided by circuit 56 by an amount corresponding to two sub-blocks, that is, one line.

Since it is not possible to perform reading and writing operations at the same time in a random access memory, the RAMs of memory devices 51 and 53 are provided with a memory cycle T defined by an access signal (FIG. 11A) and being divided into an initial reading period $T_R$ and a later writing period $T_W$ defined by the times during which a chip select signal CS (FIG. 11B) is at a low level. The reading out of the addresses then determined by circuit 56 is effected when a reading signal RE (FIG. 11C) goes low simultaneously with chip select signal CS, and the writing in memory devices 51 and 53 at the addresses then indicated by circuit 56 is effected when a writing signal WE (FIG. 11D) goes low simultaneously with signal CS.

In the embodiment being here described, the reading from any address in memory devices 51 and 53 is delayed by one field period in respect to the writing at that address. Further, the shift in response to a frame change of the absolute or actual addresses provided by circuit 56 to an extent corresponding to two subblocks is effective as to the addresses occurring during the subsequent writing operation and the addresses determined during the next reading operation follow those during the preceding writing operation. In other words, after a frame change, the addresses for writing are shifted to an extend corresponding to two sub-blocks from the addresses that would be indicated by the respective AD signals, and, in the next reading operation, the addresses have the same correspondence to the AD signals as during the preceding writing operation.

Finally, in the embodiment of this invention illustrated on FIG. 10, the reproduced digital color video signal from input terminal 52 is supplied to a dropout or error detector circuit 58 to detect a subblock having an error in the input digital color video signal which has not been conventionally corrected by the horizontal parity and the vertical parity. When such uncorrected error is detected, the resulting signal from circuit 58 is supplied to memory devices 51 and 53 to stop writing therein of the data and identifying signal, respectively, of the erroneous sub-block. For example, the signal from circuit 58 may be adapted to prevent the writing signal WE from attaining its low level, as shown in FIG. 11D by a broken line, thereby to stop the writing operation.

The operations of memory devices 51 and 53 will now be described with reference to FIGS. 12A, 12B and 12C.

In the first field of the first frame, the address map of address control circuit 56 causes sub-blocks $SB_1$, $SB_2$, ... $SB_n$ to be sequentially written in respective block addresses as shown at the left side of FIG. 12A in which, as a matter of convenience, information from the same line, that is, two sub-blocks, are arranged laterally so that field lines $Fl_1$, $Fl_2$, ... $Fl_n$ of the first and second fields of a frame may correspond to each other.

In the second field of the first frame, block addresses are appointed sequentially from the beginning by the reading address signal, that is, follow the addresses of the preceding writing cycle, and sub-block data written during the first field are read out during the reading cycle $T_R$. Then, during the writing cycle $T_W$, sub-block data in the second field having the same sub-block numbers and the same field line numbers as the above are sequentially written, as shown at the right side of FIG. 12A. If during the second field, the dropout or error detector circuit 58 detects an erroneous sub-block, the writing of this sub-block is stopped or aborted and the sub-block data of the previous or first field remains at the respective address. As mentioned above, if field numbers are the same, a line in the second field is positioned one line above the corresponding line of the first field in the pictorial representation of the complete frame. Accordingly, at the block address at which writing has been stopped or aborted there, will remain the corresponding sub-block data of a line positioned one line below the error-containing line in the pictorial representation of a complete frame.

Meanwhile, in the ID memory device 53, identifying signals ID are also being sequentially written at addresses in accordance with the AD signals of the respective sub-blocks, and, as in the memory device 51, the writing of an identifying signal ID is stopped or aborted when the signal from circuit 58 inicates that an uncorrected error has been detected in the data of the respective sub-block. In that case, an identifying signal of a sub-block containing data of a line in the first field positioned one line below the error-containing line in the second field in the picture of a complete frame will remain at that address in memory device 53.

Next, in the first field of the second frame, the appointed addresses will follow those of the preceding writing operation so that information in the second field of the first frame is read out sequentially as $SB_1$, $SB_2$, ..., during the reading period $T_R$. However, the subsequent writing addresses are sequentially appointed with a shift equivalent to two sub-blocks by reason of the change from the first frame to the second frame, and hence the sub-blocks $SB_1$, $SB_2$, ... $SB_n$ are sequentially written as shown at the left side of FIG. 12B. In this case, any line in the second field of the first frame is positioned, in the pictorial representation of a complete frame, immediately below the line in the first field of the second frame which has the next lower field line number. For example, with respect to the first field line $Fl_1$ in the first field of the second frame, the second field line $Fl_2$ in the second field of the first frame is seen to be positioned one line below the line $Fl_1$ in the pictorial representation of a frame. Therefore, when the writing of a sub-block with an error is stopped during the first field of the second frame, sub-block data of a line positioned one line therebelow in the frame picture will remain at the respective address. Thus, every time the frame is changed, the writing addresses are sequentially shifted by two sub-blocks, and in the next reading operation, the reading addresses are controlled so as to follow the precedingly established writing addresses as earlier mentioned.

After the reading of the information of the second field of the second frame during the reading period $T_R$ in the first field of the third frame, the addresses for the next writing period $T_W$ are shifted by two sub-blocks, so that the data of the sub-blocks of the first field of the third frame are written as indicated at the left-hand side of FIG. 12C.

It will be apparent from the above that, if an uncorrected error occurs in the data of a line in a second field, such error-containing data is replaced, in the output of memory device 51, by corresponding data from the line of the next previous field, that is, the first field of the same frame which, in the pictorial representation of that frame, is immediately below the error containing line. If an uncorrected error occurs in the data of a line in a first field, such error-containing data is similarly replaced, in the output of memory device 51, by corresponding data from the line of the next previous field, in this case the second field of the earlier frame, which is immediately below the error-containing line in a pictorial representation of a frame composed of the second field of the earlier frame and the first field of the frame in which the error containing line occurs. Thus, if the recorded and reproduced digital color video signal is of the PAL system, error-containing data is at all times replaced, in the output of memory device 51, by data having the same color information, but being of opposite or inverted polarities. It will also be appreciated that, whenever error-containing data is replaced in the output of memory device 51, the identifying signal ID thus appearing in the output of memory device 53 will be the ID signal associated with the error-free or substituted data rather than the ID signal associated with the error-containing data which has been replaced.

Data read out from the memory device 51 is supplied to a multiplexer 59 through a delay circuit 67, which compensates for a delay encountered in a color signal polarity inverting circuit 60 to be described below. The data from the memory device 51 is also supplied to multiplexer 59 through color signal polarity inverting circuit 60, wherein only a chrominance component C is inverted.

The color signal polarity inverting circuit 60 is shown to be formed of a digital filter 61, an adder 62 and a polarity inverter 63. The digital color video signal data read out from the memory device 51 is fed to digital filter 61 where it is separated into a luminance component Y and a chrominance component C. The luminance component Y is supplied directly to the adder 62, while the chrominance component C is inverted in polarity by inverter 63 prior to being fed to adder 62. Thus, a digital color video signal $(Y+\overline{C})$, which includes a polarity-inverted chrominance component $\overline{C}$, is obtained from adder 62.

The identifying signal ID read out from ID memory device 53 simultaneously with the read out of data from memory device 51 is supplied to a control signal generating circuit 64. A reference identifying signal synchronized with an external reference signal is also supplied from a suitable source (not shown) through a terminal 65 to control signal generating circuit 64 to be compared therein with the read out identifying signal ID from memory device 53, for example, at least in respect to the fields identified by the respective identifying signals.

So long as the sub-blocks of data applied to memory device 51 are error-free and thus occur in their original order in the output from that memory device, the corresponding identifying signals ID will also occur in their original order in the output from memory device 53 and, therefore, each ID signal from memory device 53 will identify the same frame, field and line as the reference identifying signal then being applied from terminal 65 to control signal generating circuit 64. The circuit 64 responds to such coincidence of the ID signal from memory device 53 with the reference identifying signal by causing multiplexer 59 to select the digital color video signal (Y+C) at the output of delay circuit 67 for transmission to an output terminal 66 which, for example is connected to the respective time base expander 25A, 25B or 25C on FIG. 2.

However, if error-containing data is replaced, in the output of memory device 51, by data from a line in the next previous field, the ID signal simultaneously read out of memory device 53 will identify such next previous field, rather than the field of the error-containing data, and thus will not coincide with the reference identifying signal then being received by control signal generating circuit 64. The resulting control signal from circuit 64 causes multiplexer 59 to select the digital color video signal (Y+$\overline{C}$) from color signal polarity inverting circuit 60 for transmission to output terminal 66.

It will be apparent that, in the above-described embodiment of the invention, whenever an uncorrected error appears in the data representing a PAL color video signal as received at terminal 52 of the apparatus shown on FIG. 10, such error-containing data is replaced by data of a line of the next previous field which, in a pictorial representation of a complete frame, is immediately below the line of the error-containing data, and the replaced data has the polarity of its chrominance component inverted so that the replaced data will correspond, both as to its color information and polarity, to the original color information and polarity of the error-containing data for effectively concealing the error.

Referring now to FIG. 13, it will be seen that, in another embodiment of the present invention as there illustrated, the components of the apparatus which correspond to those described above with reference to FIG. 10 are identified by the same reference numerals. In this case, the writing and reading addresses for a memory device 51' are controlled in the same manner as has been described previously for memory device 51 with reference to FIGS. 12A–12C. However, in the embodiment of FIG. 13, the memory device 53 for the ID signals and the associated circuits 54 and 64 as well as the multiplexer 59 are omitted, and the output (Y+$\overline{C}$) of color signal polarity inverting circuit 60 is applied to an input of memory device 51'.

In operation of the apparatus of FIG. 13, as data of a sub-block is being read out of an address in memory device 51' and is applied to output terminal 66, the read out data is simultaneously applied to color signal polarity inverting circuit 60 to obtain the data (Y+$\overline{C}$) in which the chrominance component has its polarity inverted, and such data (Y+$\overline{C}$) is written in memory device 51' at the same address as that from which the data is being read-out. Thereafter, when a sub-block with data having an uncorrected error is applied to input terminal 52 so that error detecting circuit 58 causes memory device 51' to abort the writing of such error-containing data at the respective address in memory device 51', the data which remains at such address is of a line in the next previous field which, in a pictorial representation of a complete frame, is positioned immediately below the error-containing line, and with the polarity of the chrominance component of such data being inverted. Thus, when the data in memory device 51' is read-out, the error-containing data is replaced with data containing substantially the same color information and with its polarity already inverted to correspond to that of the data being replaced. From the foregoing, it will be appreciated that the apparatus of FIG. 13 is effective to conceal uncorrected errors in the reproduced PAL color video signal, and does so with a relatively simpler arrangement, in that it does not require the ID memory device 53 and associated circuits of FIG. 10.

Figure 14:
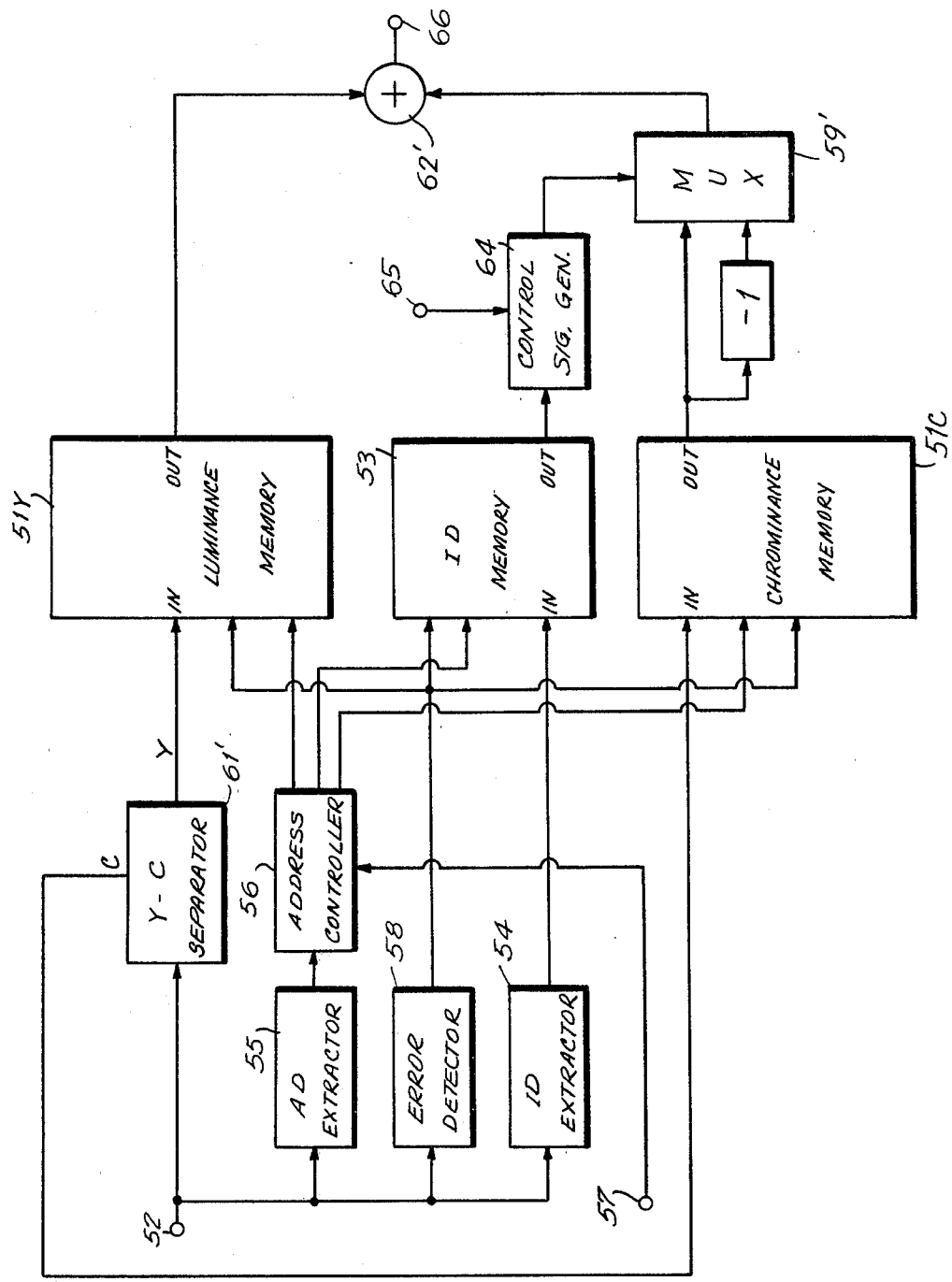
FIG. 14 is a block diagram showing a video signal processing apparatus according to still another embodiment of the invention.

In the embodiments of the invention described above with reference to FIGS. 10 and 13, respectively, the digital color video signal read out of memory device 51 or 51' is thereafter, in color signal polarity inverting circuit 60, separated into its luminance component Y and its chrominance component C, so that only the chrominance component will have its polarity inverted. However, as shown on FIG. 14, in which the various components corresponding to those of the embodiment previously described with reference to FIG. 10 are again identified by the same reference numerals, in an embodiment of this invention, the digital color video signal applied to terminal 52 may be separated, as at 61', into a luminance component Y and a chrominance component C which are respectively supplied to a luminance memory device 51Y and a chrominance memory device 51C. The luminance memory device 51Y and the chrominance memory device 51C have their writing and reading operations controlled by AD signal extractor 55, address controlling circuit 56 and error detecting circuit 58 in the same manner as has been described with reference to FIGS. 12A–12C for the apparatus of FIG. 10. Further, the apparatus of FIG. 14 is seen to include an ID memory device 53 which, in the same manner as the memory device 53 of FIG. 10, receives the ID signals from extractor 54 and has its writing and reading operations controlled in the same manner by address controlling circuit 56 and error detecting circuit 58. Further, similarly to the embodiment of FIG. 10, the ID signals read out of memory device 53 are applied to a control signal generating circuit 64 for comparison in the latter with reference identifying signals from a terminal 65. However, in the embodiment of FIG. 14, the chrominance components of the data read out of chrominance memory device 51C are applied directly to one input of a multiplexer 59', and also through a polarity inverting circuit 63' to another input of multiplexer 59'. The multiplexer 59' is controlled by a signal from control signal generating circuit 64 and the output of multiplexer 59' is applied to one input of an adder 62' which, at its other input, receives the luminance components of the data read out of luminance memory device 51Y. Finally, the output of adder 62' is applied to output terminal 66.

So long as the sub-blocks of data applied to terminal 52 are error-free so that the luminance and chrominance components thereof occur in their original order in the outputs from memory device 51Y and memory device 51C, respectively, the corresponding identifying signals ID will also occur in their original order in the output from memory device 53 and, therefore, each ID signal from memory device 53 will identify the same frame, field and line as the reference identifying signal then being applied from terminal 65 to control signal generating circuit 64. The circuit 64 corresponds to such coincidence of the ID signal from memory device 53 with the reference identifying signal by causing multiplexer 59' to select the output of chrominance memory device 51C applied directly to multiplexer 59' for transmission to adder 62' which is simultaneously receiving the luminance component of the corresponding sub-block. Thus, the digital color video signal (Y+C) is delivered to output terminal 66. However, if error-containing data is applied to input terminal 52, the writing of the luminance and chrominance components of such error-containing data in memory devices 51Y and 51C, respectively, is aborted, as is the writing of the respective ID signal is memory device 53, similarly to the arrangement in the embodiment of FIG. 10, so that the error-containing data is replaced, in the outputs of memory devices 51Y and 51C, by data from a line in the next previous field, and the ID signal simultaneously read out of memory device 53 will identify such next previous field, rather than the field of the error-containing data. Thus, the ID signal being read out of memory device 53 will not coincide with the reference identifying signal then being received by control signal generating circuit 64, and the resulting control signal from circuit 64 causes multiplexer 59' to select the output of inverter 63', that is, the chrominance component from memory device 51C with its polarity being inverted, for combining in adder 62' with the luminance component from memory device 51Y to form the output at terminal 66.

It will be apparent from the above that, with the embodiment of the invention illustrated on FIG. 14, whenever an uncorrected error appears in the data representing a PAL color video signal received at terminal 52, such error-containing data is replaced by data of a line of the next previous field which, in a pictorial representation of a complete frame, is immediately below the line of the error-containing data, and the replaced data has the polarity of its chrominance component inverted so that the replaced data will correspond, both as to its color information and polarity, to the original color information and polarity of the error-containing data for effectively concealing the error therein.

In the embodiments of this invention described above with reference to FIGS. 10, 13 and 14, it has been assumed that the color video signal being processed is of the PAL system. However, the present invention may be similarly applied to an NTSC color video signal. In the event that an NTSC color video signal is being processed, the addresses at which data is written in the memory device 51 (FIG. 10), 51' (FIG. 13) or 51Y or 51C (FIG. 14) are controlled to correspond to the address at which there was earlier written data for the line which, in the pictorial representation of a complete frame, is positioned immediately above the line of the video signal being written. Thus, the data stored in a memory device in place of the error-containing data of the NTSC color video signal will have color information corresponding to that of the error-containing data, but of opposite polarity to the latter. On reading out of the data the chrominance component of the read out data which replaces error-containing data has its polarity inverted so that the error-containing data may again be effectively concealed.

In the above-described embodiments of the invention, the reading of data from a memory device has been delayed by one field relative to the writing of such data in the memory device, but it is apparent that such delay between the writing and reading operations may be less than one field. Further, in the described embodiments, the sampling frequency employed has been four times the color subcarrier frequency $f_{SC}$. However, the sampling frequency can be selected to be three times the color subcarrier frequency, provided that, in the processing of a PAL color video signal, error-containing data is replaced by corresponding data in a line of the next previous field which, in a pictorial representation of a complete frame, is positioned immediately below the line of the error-containing data.

Although the memory devices 51, 51' and 51Y and 51C have been described herein as being employed in an error-concealing operation, it will be appreciated that such memory devices can also be employed in an error correcting operation using the CRC code included in each sub-block and the horizontal and vertical parity data included in the transmitted matrix as on FIG. 7.

Having described various specific embodiments of the present invention and a number of modifications thereof, it is to be understood that the invention is not limited to those precise embodiments and modifications, and that various changes and further modifications can be effected therein by one skilled in the art without departing from the scope or spirit of this invention as defined in the appended claims.

What is claimed is:

1. Apparatus for processing a PAL color video signal including luminance and chrominance components and being composed of successive frames each having a plurality of fields constituted by successive respective lines which are interlaced in a pictorial representation of the complete frame, said apparatus comprising:
    memory means having an input for receiving the video signal and a capacity suitable for the temporary storage of a field of said video signal;
    means for causing the writing of the video signal received by said memory means at an address in the latter at which there was earlier written the video signal for a line of the next previous field which, in said pictorial representation of the complete frame, is positioned immediately below the line of the video signal being received;
    means for detecting an error in the video signal being received and for inhibiting the writing in said memory means of the error-containing video signal;
    means for reading out the video signal stored in said memory means;
    means for inverting the phase of the chrominance component of said video signal read out from the memory means; and
    means for adding the phase-inverted chrominance component to the luminance component of the video signal read out of said memory means upon the detection of an error.

2. Apparatus according to claim 1; wherein said color video signal is a digital signal converted from an analog color video signal and is divided into a plurality of sub-blocks each having a block address signal and an identifying signal.

3. Apparatus according to claim 2; further comprising:
identifying signal extracting means for extracting said identifying signal from each said sub-block of said color video signal;
identifying signal memory means for memorizing the extracted identifying signal; and
control signal generator means for comparing an identifying signal read out from said identifying signal memory means with an external reference signal and generating a control signal to select an output from said means for adding as an output of the apparatus when an error is detected in the received video signal.

4. Apparatus according to claim 1; further comprising means for feeding back an output from said means for adding to an input of said memory means; and wherein, immediately after reading out of a video signal from an address in said memory means, said output fed back from said means for adding to said input of the memory means is re-written at said address in the memory means from which the video signal was last read out.

5. Apparatus according to claim 1; wherein said memory means includes a first memory for the writing therein of said luminance component, and a second memory for the writing therein of said chrominance component.

6. Apparatus according to claim 5; wherein said means for adding includes an adding circuit having a first input receiving a luminance component read out of said first memory and a second input; and further comprising multiplexing means having a first state for applying to said second input a chrominance component as read out of said second memory, and a second state in which the chrominance component read out of said second memory is applied to said second input by way of said means for inverting, and control means normally disposing said multiplexing means in said first state and changing over said multiplexing means to said second state in response to an error being detected in the received video signal.

7. A method of processing a PAL color video signal including luminance and chrominance components and being composed of successive frames each having a plurality of fields constituted by successive respective lines which are interlaced in a pictorial representation of the complete frame, said method comprising the steps of:
temporarily storing a field of the video signal by writing the received video signal at an address in a memory at which there was earlier written the video signal for a line of the next previous field which, in said pictorial representation of the complete frame, is positioned immediately below the line of the video signal being received;
detecting an error in the video signal being received and inhibiting the writing in said memory of the error-containing video signal;
reading out the video signal stored in said memory;
inverting the phase of the chrominance component of said video signal read out from the memory; and
adding the phase-inverted chrominance component to the luminance component of the video signal read out of said memory upon the detection of an error.

8. A method according to claim 7; wherein said color video signal is a digital signal converted from an analog color video signal and is divided into a plurality of sub-blocks each having a block address signal and an identifying signal.

9. A method according to claim 8; further comprising the steps of:
extracting said identifying signal from each said sub-block of said color video signal;
memorizing the extracted identifying signal; and
comparing a memorized identifying signal with an external reference signal, and, upon a difference therebetween, selecting the result of said adding as a replacement for an error-containing received video signal.

10. A method according to claim 7; further comprising feeding back the result of said adding to an input of the memory; and wherein, immediately after reading out of a video signal from an address in the memory, said result of the adding fed back to said input of the memory is re-written at said address therein from which the video signal was last read out.

11. A method according to claim 7; in which said luminance and chrominance components are written in respective memories.

* * * * *